(12) United States Patent
Xia et al.

(10) Patent No.: US 7,962,584 B2
(45) Date of Patent: Jun. 14, 2011

(54) USAGE OF HOST GENERATING INTERFACE IDENTIFIERS IN DHCPV6

(75) Inventors: Yangsong Xia, Jiangsu Province (CN); Behcet Sarikaya, Wylie, TX (US)

(73) Assignee: FutureWei Technologies, Inc., Plano, TX (US)

( * ) Notice: Subject to any disclaimer, the term of this patent is extended or adjusted under 35 U.S.C. 154(b) by 157 days.

(21) Appl. No.: 12/199,058

(22) Filed: Aug. 27, 2008

(65) Prior Publication Data
US 2009/0204691 A1  Aug. 13, 2009

Related U.S. Application Data

(60) Provisional application No. 61/028,461, filed on Feb. 13, 2008.

(51) Int. Cl.
*G06F 15/177* (2006.01)

(52) U.S. Cl. ........ 709/220; 709/222; 709/230; 709/245; 726/21

(58) Field of Classification Search ........... 709/220, 709/222; 726/21
See application file for complete search history.

(56) References Cited

U.S. PATENT DOCUMENTS

| 7,103,648 | B1 | 9/2006 | Burrows | |
|---|---|---|---|---|
| 7,218,634 | B1 | 5/2007 | Khalil et al. | |
| 7,836,155 | B2 * | 11/2010 | Kang et al. | 709/220 |
| 2004/0205211 | A1 * | 10/2004 | Takeda et al. | 709/230 |
| 2004/0243850 | A1 * | 12/2004 | Oishi | 713/201 |
| 2005/0220144 | A1 | 10/2005 | Ishiyama et al. | |
| 2006/0015595 | A1 * | 1/2006 | Shantala et al. | 709/222 |
| 2008/0263353 | A1 * | 10/2008 | Droms et al. | 713/153 |

FOREIGN PATENT DOCUMENTS

| CN | 1835514 A | 9/2006 |
|---|---|---|
| CN | 1859444 A | 11/2006 |
| CN | 1972317 A | 5/2007 |
| EP | 1583323 A1 | 10/2005 |

OTHER PUBLICATIONS

International Application No. PCT/CN2009/070416, International Search Report and Written Opinion, 10 pages, Apr. 30, 2009.
Arkko, J. et al., "SEcure Neighbor Discovery (SEND)," The Internet Society, RFC 3971, 72 pages, Mar. 2005.
Aura, T., "Cryptographically Generated Addresses (CGA)," The Internet Society, RFC 3972, 29 pages, Mar. 2005.
Bradner, S., "Key Words for Use in RFCs to Indicate Requirement Levels," RFC 2119, 3 pages, Mar. 1997.
Droms, R. et al., "Dynamic Host Configuration Protocol for IPv6 (DHCPv6)," The Internet Society, RFC 3315, 129 pages, Jul. 2003.
Hinden, R. et al., "IP Version 6 Addressing Architecture," The Internet Society, RFC 4291, 32 pages, Feb. 2006.

(Continued)

*Primary Examiner* — Kyung-Hye Shin
(74) *Attorney, Agent, or Firm* — Slater & Matsil, L.L.P.

(57) ABSTRACT

The present invention provides a local area network system including a computational device or a host, a network apparatus and communication channel (e.g. router). The invention also provides a method for configuring IPv6 addresses in the host. The method includes separating a prefix assignment from generation of an interface identifier. The prefix may be stored in a DHCPv6 server. The procedure further includes requesting the prefix from the DHCPv6 server by the host, generating the interface identifier in the host, and combining the prefix and the generated interface identifier to formulate an IP address in the host, registering the IP address in the DHCPv6 server, and granting the usage of the IP address to the host by the DHCPv6 server.

34 Claims, 5 Drawing Sheets

OTHER PUBLICATIONS

Madanapalli, S., "Analysis of IPv6 Link Models for IEEE 802.16 Based Networks," The IETF Trust, RFC 4968, 16 pages, Aug. 2007.

Narten, T. et al., "Neighbor Discovery for IP Version 6 (IPv6)," The IETF Trust, RFC 4861, 124 pages, Sep. 2007.

Narten, T. et al., "Privacy Extensions for Stateless Address Autoconfiguration in IPv6," The Internet Society, RFC 3041, 22 pages, Jan. 2001.

Narten, T. et al., "Privacy Extensions for Stateless Address Autoconfiguration in IPv6," The IETF Trust, RFC 4941, 30 pages, Sep. 2007.

Troan, O. et al., "IPv6 Prefix Options for Dynamic Host Configuration Protocol (DHCP) Version 6," The Internet Society, RFC 3633, 25 pages, Dec. 2003.

Vixie, P. et al., "Dynamic Updates in the Domain Name System (DNS Update)," RFC 2136, 33 pages, Apr. 1997.

Wasserman, M., "Recommendations for IPv6 in Third Generation Partnership Project (3GPP) Standards," The Internet Society, RFC 3314, 30 pages, Sep. 2002.

Narten, T., et al., "Neighbor Discovery for IP version 6 (IPv6)," Network Working Group, RFC 4861, Sep. 2007, 98 pages.

* cited by examiner

USAGE OF HOST GENERATING INTERFACE IDENTIFIERS IN DHCPV6

CROSS-REFERENCES TO RELATED APPLICATIONS

This application is a Non-Provisional application, and claims the benefit of, co-pending, commonly-assigned, Provisional U.S. Patent Application No. 61/028,461, entitled "USAGE OF HOST GENERATING INTERFACE IDENTIFIERS IN DHCPv6", filed on Feb. 13, 2008, the entire application of which is herein incorporated by reference for all purposes.

BACKGROUND OF THE INVENTION

The present invention relates to separation of a prefix assignment from generation of an interface identifier in a Dynamic Host Configuration Protocol (DHCP) v6 server, and to generation of a dynamic IP address. The invention may be understood by reference to the documents cited by the present disclosure, all of which are incorporated herein by reference.

A DHCPv6 server is assumed to be responsible for assignment of an integrated or combined internet protocol (IP) address that includes two portions, i.e. a prefix and an interface identifier. The operation of address assignment by a DHCPv6 server is described in [Request for Comments (RFC)3315]. A client uses a Solicit message to identify the DHCPv6 server that is configured to assign IP addresses. The DHCPv6 server sends an Advertise message in response to announce the availability of the DHCPv6 server to the client. The client then uses a Request message to request an IP address. The DHCPv6 server then returns the IP address in a Reply message. The details of the two portions of the IP address, i.e. a prefix and an interface identifier, are described in [RFC4291].

A prefix assignment may be separated from generation of interface identifier. For example, [RFC3633] describes Prefix Delegation options that provide a mechanism for automated delegation of IPv6 prefixes using the DHCPv6. This mechanism is intended for delegating a long-lived prefix from a delegating router to a requesting router. However, the practice of separating prefix assignment from interface identifier assignment is only used for routers, but not for hosts in [RFC3633].

There are situations when a separation of a prefix assignment and a generation of an interface identifier is desired. Currently, a DHCP server may not be able to generate an interface identifier for a host. Hence, there remains a need for developing a method to formulate an IP address from separated prefix and interface identifier that may be generated to meet the need of security or privacy.

BRIEF SUMMARY OF THE INVENTION

Embodiments of the present invention provide a local area network system including a computational device or a host, a network apparatus and communication channel (e.g. router). Embodiments of the invention also provide a method for configuring IPv6 addresses in the host. According to the embodiments of the invention, the method comprises separating a prefix assignment from generation of an interface identifier. The prefix may be stored in a DHCPv6 server. The method further comprises requesting the prefix from the DHCPv6 server by the host, generating the interface identifier in the host, and combining the prefix and the generated interface identifier to formulate an IP address in the host, registering the IP address in the DHCPv6 server, and granting the usage of the IP address to the host by the DHCPv6 server.

In a first set of embodiments, a method is provided for identifying a DHCP server by sending a soliciting message from a host, and assigning a prefix from the DHCP server to the host. A method is further provided for generating an interface identifier, combining the prefix and the generated interface identifier to formulate an IP address in the host. A method is also provided for registering the IP address in the DHCP server that grants or denies the usage of the IP address to the host.

In a second set of embodiments, a computational device comprises an input device, a communications system, a storage device, a processor, and a memory coupled with the processor, the memory comprising a computer-readable medium having a computer-readable program embodied therein for directing operation of the computational device, the computer readable program including instructions for receiving prefixes with the communications system, instructions for generating interface identifiers, and instructions for combining the prefixes and the generated interface identifier. The prefixes are provided to the host by a DHCP server.

In a third set of embodiments, a network apparatus comprises a network interface, a memory, and a processor. The network interface is connected to a router, where the network interface is adapted to receive a first request for providing prefixes from the network apparatus. The network interface is also configured to send a response to the router. The network interface is further configured to receive a second request for registering an Internet Protocol (IP) address, the IP address including separated prefixes and interface identifiers. The memory is configured to store the prefixes, the IP address and system information. Furthermore, the processor is configured to process the first and second request. The interface identifiers are generated in a computational device that is in a communication with the network apparatus through the router. The IP address is formulated by combining the prefixes and the generated interface identifiers.

In a further set of embodiments, a system for generating Internet Protocol (IP) addresses comprises a Dynamic Host Configuration Protocol (DHCP) server, at least one host, a communication channel between the DHCP and the host for sending request and/or transferring data. The communication channel may be a router. The DHCP server has a memory for storing a list of prefixes of internet protocol (IP) addresses. The host comprises a processor for generating interface identifiers (IDs) and configuring the IP addresses by combining the generated IDs and the prefixes, a display screen coupled to the processor for providing a list of available features to a user, and an input device coupled to the processor for receiving request from a user.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components.

DETAILED DESCRIPTION OF THE INVENTION

Generation of Interface Identifier in A Host

Figure 1:
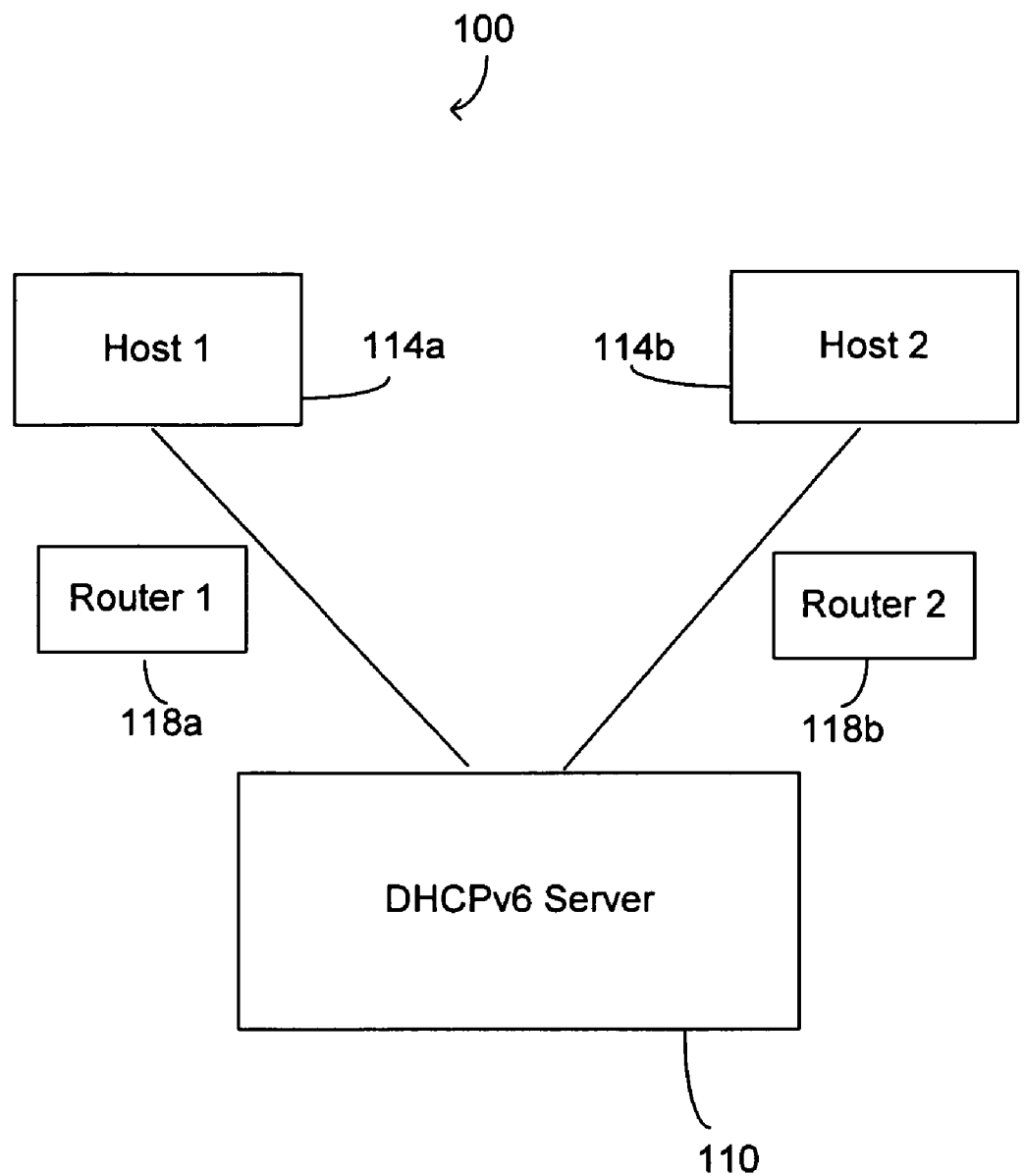
FIG. 1 shows a simplified network system.

FIG. 1 shows a simplified exemplary embodiment of a network system 100. The network system 100 may include a DHCP server 110, and two hosts 114a and 114b, and two routers 118a and 118b. Each host 114a and 11b may be capable of accessing a world wide network (not shown), such as the internet. The network system 100 may include any number of hosts or other devices, for example, information appliances, network devices, peripherals, and the like. A feature of DHCP server 110 is that it automatically assigns an IP address to each host 114a and 114b. No user interaction is required. In accordance with the embodiment of the invention, an IP address is formulated by combining a prefix stored in the DHCP server 110 and a generated interface identifier in the host 114a and 114b. The IP address may be dynamic.

A host may be used to generate an interface identifier. [RFC3972] describes a method for binding a public signature key to an IPv6 address in the Secure Neighbor Discovery (SEND) protocol [RFC3971]. The basic idea of [RFC3972] is to generate the interface identifier (i.e., the rightmost 64 bits) of the IPv6 address by computing a cryptographic hash of the public key.

In order to generate an interface identifier in a host, a prefix may be used to identify the host at first. [RFC4968] provides different IPv6 link models that are suitable for 802.16 based networks and a point-to-point link model is desired. Also, 3GPP and 3GPP2 have earlier adopted the point-to-point link model based on the recommendations in [RFC3314]. In this model, only one prefix can be assigned to one interface of a host (e.g. mobile station), and different hosts (mobile stations) do not share a common prefix. For example, a first prefix may be used to identify a first host, and a second host may be used to identify a second host.

In a further embodiment, the two portions of an IP address (i.e. prefix and interface identifier) need to be separated. By using a DHCPv6 server, a separation of a prefix assignment and an interface identifier generation may be achieved. A prefix of an IP address of a host may be allocated from the DHCPv6 server, while an interface identifier may be independently generated by the host. In one embodiment, the generation of the interface identifier may be dependent upon the prefix assignment. In another embodiment, the generation of the interface identifier may be independent of the prefix assignment.

Many common terminologies in this disclosure are defined as described in [RFC3315]. Additional definitions of some terminologies related to the embodiment of the invention are provided as the following.

A derivative prefix is derived from another prefix. For example, a /64 prefix is a derivative prefix that is derived from a /48 prefix, where the /64 prefix has the same leftmost 48 bits with the /48 prefix.

As explained earlier, a prefix is assigned to a host. This prefix needs to be authorized. For each prefix, a specific router is specified to authorize the prefix for use. For each router, a specific set of subnet prefixes may be provided to advertise. Other routers may have authorizations to advertise other subnet prefixes. In a specific embodiment, a first router is specified to authorize a first prefix to a first host, and a second router is specified to authorize a second prefix to a second host. A Certification Path Advertisement message may be used to convey the authorized prefix in [RFC3971].

Router Advertisements, as described in [RFC4861], may allow routers to inform a host on how to perform Address Auto-configuration in Secure Neighbor Discovery (SEND). For example, routers may specify whether the hosts should use a DHCPv6 and/or stateless address configuration when a stateless server is used. The stateless server is a server that treats each request as an independent transaction that is unrelated to any previous request. In a Router Advertisement message, M and O bits are used for indication of a mode of Address Auto-configuration.

When a host uses the mode of Address Auto-configuration, two components are desirable for the host to generate an IPv6 address. First, a prefix part may be provided by a DHCP server. In [RFC3971], Certification Path Solicitation and Certification Path Advertisement messages are designed for verifying that routers are authorized for use. Certification Path Advertisement message may also be used to verify that routers are authorized to advertise a certain set of subnet prefixes. In stateless auto-configuration mode, the prefixes in Router Advertisement message should be a subset of authorized prefixes, or derivative prefixes from authorized prefixes. On the other hand, in the stateful auto-configuration mode, a procedure for prefix allocation from a DHCPv6 server is illustrated in section 4 of [RFC3971]. Second, an interface identifier may be generated by the host by using [RFC3972]. For example, [RFC3972] may generate the interface identifier (i.e., the rightmost 64 bits) of the IPv6 address by computing a cryptographic hash of a public key of a host.

DHCPv6 Assignment of IP Address to A Host

Figure 2:
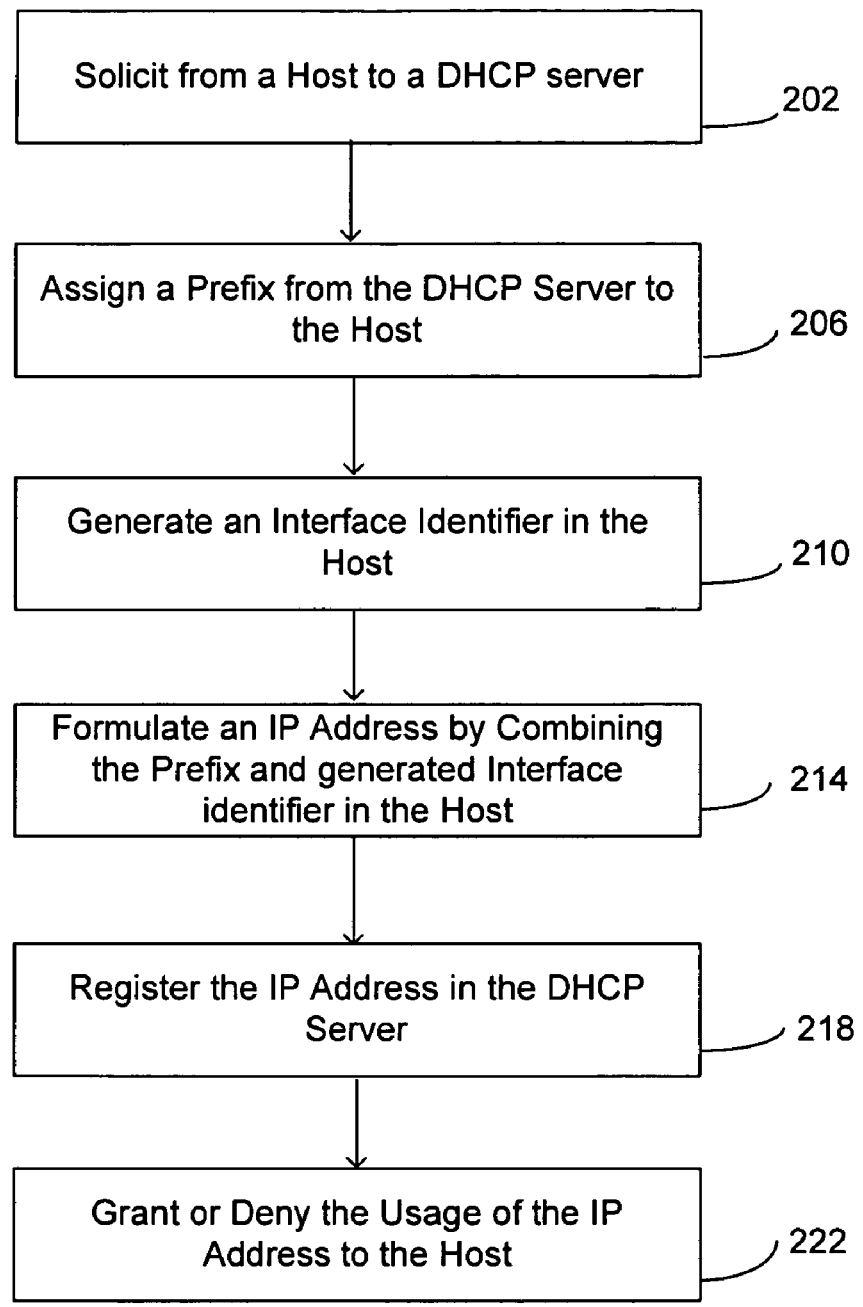
FIG. 2 is a flow diagram to illustrate the operation of generation of an interface identifier in a host and formulating an IP address by combining a prefix assignment stored in a DHCPv6 server and the generated interface identifier in the host.

FIG. 2 is a flow diagram to illustrate steps of assigning an IP address from the DHCP server 110 to the host 114a or 114b, including generation of an IP address by combining a prefix assignment stored in a DHCPv6 server 110 and generated interface identifier in the host 114a or 114b.

The process begins at block 202, when the host 114a or 114b uses a Solicit message to identify a DHCP server 110 that is configured to assign a prefix for the host 114a or 114b. Identity Association for Prefix Delegation Option (IA_PD) is defined in [RFC3633] for a prefix delegation between a requesting router and a delegating router. The Identity Association for Prefix Assignment Option (IA_PA) may be designed for providing a prefix assignment from a DHCPv6 server to a host. The host uses hints as a prefix assignment preference. For example, in a cryptographically Generated Addresses (CGA) scenario, the hints are authorized prefixes that are advertised by using a specific router through a Certification Path Advertisement as defined in [RFC3971].

At block 206, based on the hints, the DHCP server assigns one or more prefixes to the host or hosts. In the CGA scenario, the assigned prefixes may be subsets of the authorized prefixes or derivative prefixes of the authorized prefixes. Identity Association for Prefix Assignment Option (IA_PA) is used for conveying the assigned prefixes. More details on IA_PA will be provided in the following section. If no authorized prefix is available, a status-code is sent from the DHCP server to the host to terminate the prefix assignment.

At block 210, the host 114a or 114b generates an interface identifier. There are many ways to generate interface identifiers. In one embodiment, [RFC3972] defines a method to generate the interface identifiers by computing a cryptographic hash of a public key of the host. In another embodiment, [RFC4941] describes a method to derive the interface identifiers from IEEE 802 addresses. In a further embodiment, interface identifiers may be generated via random number generation [RFC3041].

At block 214, the host 114a or 114b formulates a combined IPv6 address by concatenating the assigned prefix and the generated interface identifier in the host. Once the IP address is configured in the host 114a or 114b, the host 114a or 114b sends a Request message to the DHCP server 110 to register the combined IP address at block 218. An IP Address Validation option may be used to store the configured or combined IP address on the DHCP server 110. The DHCP server 110 may grant the usage of the combined IP address by sending a Reply with Identification Association (IA) Address Validation option At block 222. Alternatively, a status-code may be included in the IA Address Validation option to deny the usage of the combined IP address.

DHCPv6 Options

In this section, two new options are defined, i.e. Identity Association for Prefix Assignment (IA_PA) option and Identification Association (IA) Address Validation Option. Furthermore, an existing option, i.e. IA_PD Prefix option, is also described.

In one embodiment, the IA_PA option may be used to execute a prefix assignment identification association. The IA_PA options comprise the prefixes and the parameters associated with the IA_PD Prefix option, such as Option-length, Option_IAADDR_VAL, IPv6 address, preferred-lifetime, valid lifetime, etc.

Figure 3:
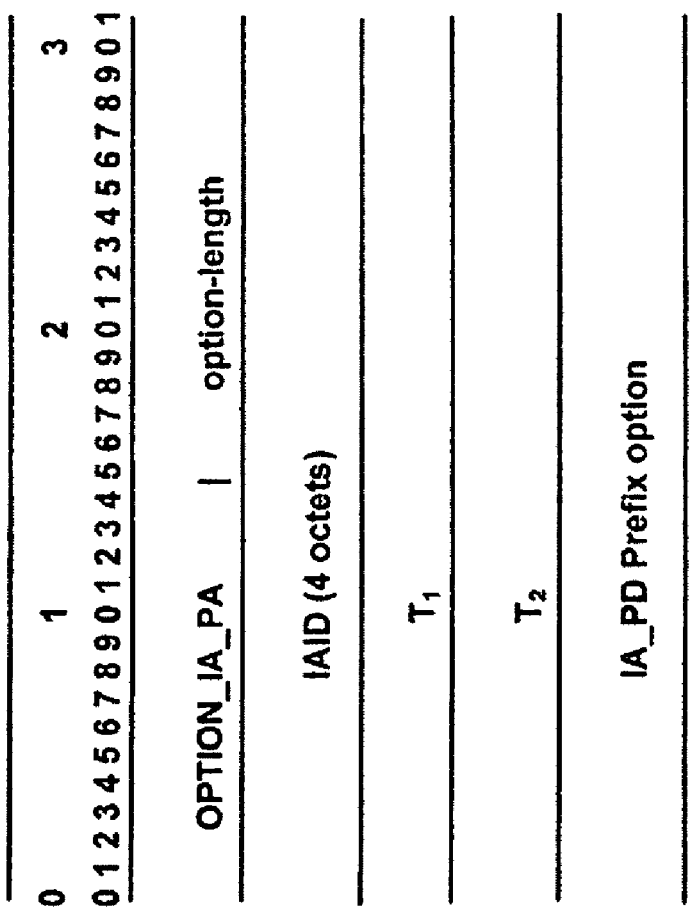
FIG. 3 shows a format of the IA_PA option.

The format of the IA_PA option is as shown in FIG. 3. An option-code is OPTION_IA_PA. An option-length of the IA_PA-option field is 12+ length. An Identification Association Identifier (IAID) is a unique identifier for the IA_PA option. In other words, each IAID is associated with a single identifier for a first host. A different IAID is associated with another identifier for a second host. In FIG. 3, $T_1$ represents a time duration during which the host may contact a first DHCPv6 server 110 to extend lifetimes of the prefixes assigned to the IA_PA option from a current time. The prefixes in the IA_PA option may be obtained from the DHCPv6 server. $T_2$ represents a time duration during which the host may contact any other available DHCPv6 server to extend lifetimes of the prefixes assigned to the IA_PA from a current time. The extended lifetimes may be in the order of seconds.

Figure 4:
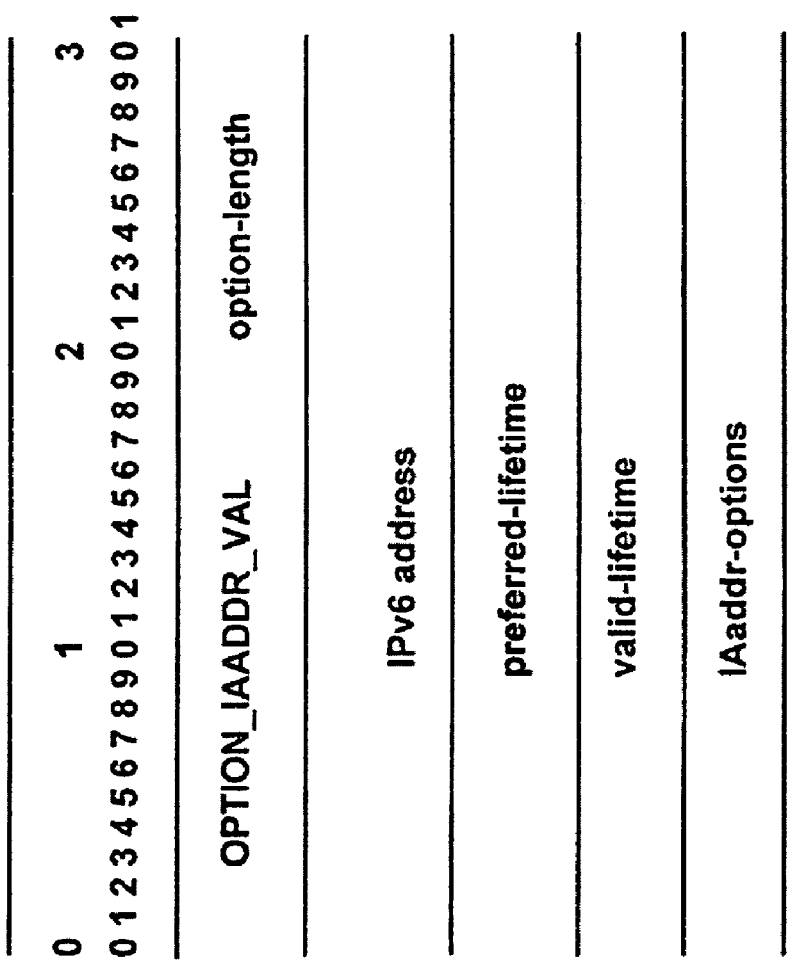
FIG. 4 shows a format of the IA_PD Prefix option

The format of the IA_PD Prefix option is as shown in FIG. 4. An option-code is OPTION_IAADDR_VAL. An option-length of IAaddr-option field is 24+ length. A preferred-lifetime for an IPv6 address in the IA_PD Prefix option is expressed in seconds. The valid-lifetime for the IPv6 address in the IA_PD Prefix option is also expressed in seconds. The IAaddr-options are associated with the IPv6 address.

The IA_PD Prefix option is described in [RFC3633]. IA_PD Prefix option is originally used for conveying a prefix information between a delegating router and a requesting router. [RFC3633] involves a prefix assignment or delegation between a delegating router and a requesting router, while the embodiment of the invention involves a prefix assignment or delegation between a DHCP server and a host. Note that the devices involved are different between [RFC3633] and the embodiment of the invention.

In a specific embodiment of the invention, the IA_PD Prefix option may be used to specify IPv6 address prefixes associated with the IA_PA option as set forth above. The IA_PD Prefix option may be encapsulated in the field of the IA_PA option.

In another embodiment, the IA Address Validation Option may be encapsulated in the optional field of an identity association for temporary addresses (IA_TA) option. The IA_TA option is described in [RFC3315]. A host may send the IA Address Validation Option to a DHCP server for validating the usage of an IP address in the host.

The status of any operations involving this IA Address Validation Option may be indicated in a status-code option in the IAAddr-option field. The details of such field are described in [RFC3315]. A status-code may be assigned by Internet Assigned Number Authority (IANA). To indicate a status, a value of OPTION_IA_PA and OPTION_IAADDR_VAL may be assigned by IANA. If the status is ValdidationFailure, the DHCPv6 server 110 may not grant the usage of an address in IA Address Validation Option.

Furthermore, it is important to ensure security of a prefix assignment and an IP address confirmation. Security considerations in DHCPv6 are described in [RFC3315]. To guard against attacks through a prefix assignment and an address confirmation, a host and a DHCPv6 server may use a DHCP authentication as described in a section under "Authentication of DHCP messages" of [RFC3315].

In addition, the following references are provided, and the entire contents of all the references listed below are incorporated herein by reference for all purposes.

[RFC2119] is described in Bradner, S., "Key Words for Use in Request for Comments (RFCs) to Indicate Requirement Levels", BCP 14, RFC 2119, March 1997.

[RFC4861] is described in Narten, T., Nordmark, E., Simpson, W., and H. Soliman, "Neighbor Discovery for IP version 6 (IPv6)", RFC 4861, September 2007.

[RFC3971] is described in Arkko, J., Kempf, J., Zill, B., and P. Nikander, "SEcure Neighbor Discovery (SEND)", RFC 3971, March 2005.

[RFC3972] is described in Aura, T., "Cryptographically Generated Addresses (CGA)", RFC 3972, March 2005.

[RFC3315] is described in Droms, R., Bound, J., Volz, B., Lemon, T., Perkins, C., and M. Carney, "Dynamic Host Configuration Protocol for IPv6 (DHCPv6)", RFC 3315, July 2003.

[RFC3633] is described Troan, O. and R. Droms, "IPv6 Prefix Options for Dynamic Host Configuration Protocol (DHCP) version 6", RFC 3633, December 2003.

[RFC4291] is described Hinden, R. and S. Deering, "IP Version 6 Addressing Architecture", RFC 4291, February 2006.

[RFC4941] is described Narten, T., Draves, R., and S. Krishnan, "Privacy Extensions for Stateless Address Autoconfiguration in IPv6", RFC 4941, September 2007.

[RFC2136] is described in Vixie, P., Thomson, S., Rekhter, Y., and J. Bound, "Dynamic Updates in the Domain Name System (DNS UPDATE)", RFC 2136, April 1997.

[RFC4968] is described Madanapalli, S., "Analysis of IPv6 Link Models for 802.16 Based Networks", RFC 4968, August 2007.

[RFC3314] is described in Wasserman, M., "Recommendations for IPv6 in Third Generation Partnership Project (3GPP) Standards", RFC 3314, September 2002.

[RFC3041] is described in Narten, T. and R. Draves, "Privacy Extensions for Stateless Address Autoconfiguration in IPv6", RFC 3041, January 2001.

Figure 5:
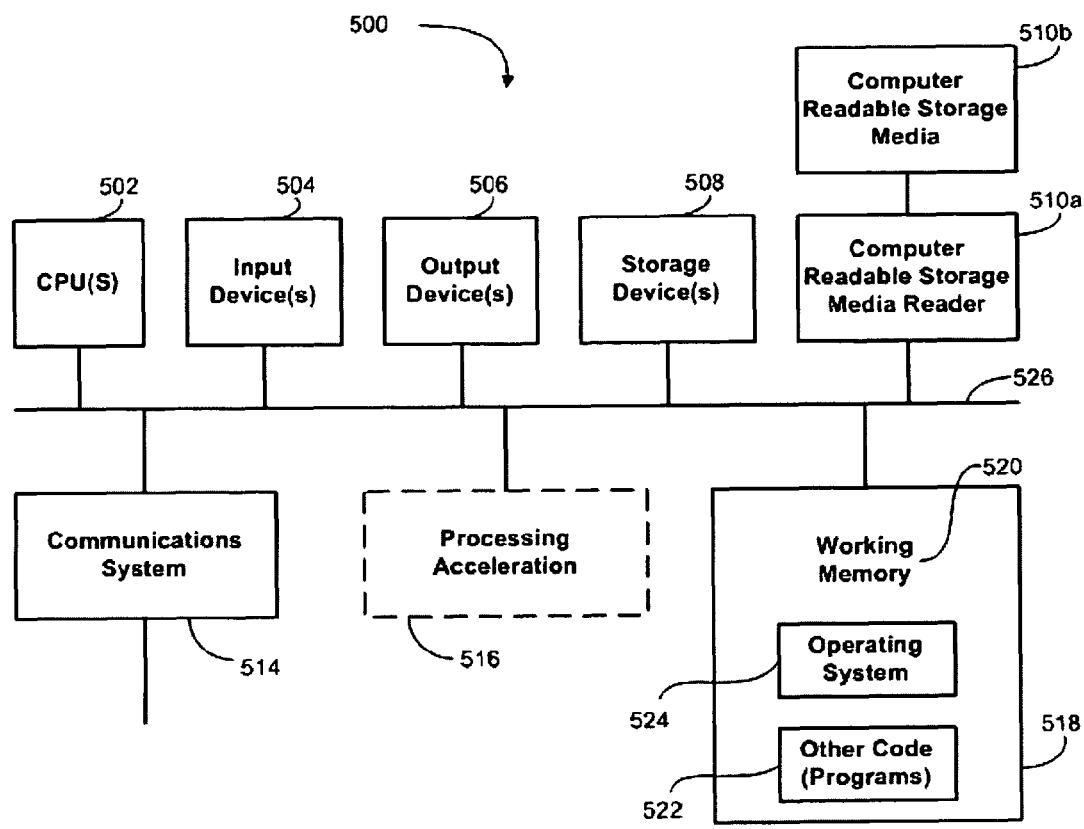
FIG. 5 is a diagram of a computational device.

A general structure for a computational device is provided with a schematic illustration in FIG. 5, in which the computational device is denoted generally by reference numeral 500. FIG. 5 broadly illustrates how individual system elements may be implemented in a separated or more integrated manner. The computational device 500 is shown comprised of hardware elements that are electrically coupled via bus 526, including a processor 502, an input device 504, an output device 506, a storage device 508, a computer-readable storage media reader 510a, a communications system 514, a processing acceleration unit 516 such as a DSP or special-purpose processor, and a memory 518. The computer-readable storage media reader 510a is further connected to a non-transitory computer-readable storage medium 510b, the combination 510a and 510b comprehensively representing remote, local, fixed, and/or removable storage devices plus storage media for temporarily and/or more permanently containing computer-readable information. The communications system 514 may comprise a wired, wireless, modem, and/or other type of interfacing connection and permits data to be exchanged with other nodes comprised by the network to implement embodiments as described above.

The computational device 500 may also comprise fewer components than described above, at least including a processor 502, a communications system 514, and a memory 518.

The computational device 500 also comprises software elements, shown as being currently located within working memory 520, including an operating system 524 and other code 522, such as a program designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

In summary, after acquiring a prefix from a DHCP server 110, a host may generate a cryptographic interface identifier as described in [RFC3972], and then sends the generated interface identifier to the DHCP server 110. The host formulates an IP address by combining the interface identifier generated from the host and the prefix assigned to the host from the DHCP server 110. The DHCP server 110 may grant or deny the usage of the combined address using a Reply message.

The present description of the disclosed embodiments is provided to enable those skilled in the art to make or use the present invention. Various modifications to these embodiments will be readily apparent to those skilled in the art and generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for configuring Internet Protocol (IP) addresses in a host, comprising:
   using an identity association for prefix assignment option, providing a first portion of an IP address to at least one host by transmitting the identity association for prefix assignment option from a DHCP server to the at least one host, wherein the first portion comprises a prefix, wherein the identity association for prefix assignment option comprises:
      a unique identifier for the at least one host and an identity association for prefix delegation option,
      a first time representing a time duration during which the host may contact the DHCP server to extend lifetimes of the prefix, and
      a valid lifetime for an IPv6 address;
   generating an interface identifier by computing a cryptographic hash of a public key of the at least one host;
   generating a second portion of the IP address in the host, wherein the second portion comprises the interface identifier; and
   combining the first portion and the second portion to generate the IP address.

2. The method for configuring IP addresses of claim 1, further comprising requesting the prefix from the DHCP server to generate the interface identifier associated with the prefix.

3. The method for configuring IP addresses of claim 1, further comprising combining the generated interface identifier and the prefix in the host.

4. The method for configuring IP addresses of claim 1, wherein the IP address comprises a dynamic IP address.

5. The method for configuring IP addresses of claim 1, wherein the prefix is predefined and stored in the DHCP server.

6. The method for configuring IP addresses of claim 1, wherein the prefix is authorized by a router.

7. The method for configuring IP addresses of claim 1, wherein the prefix is provided to an interface of the host.

8. The method for configuring IP addresses of claim 1, wherein a first prefix is provided to a first interface of a first host, and a second prefix is provided to a second interface of a second host.

9. The method for configuring IP addresses of claim 8, wherein the first prefix is authorized by a first router, a first set of subnet prefixes is provided to the first router; and wherein the second prefix is authorized by a second router, a second set of subnet prefixes is provided to the second router.

10. The method for configuring IP addresses of claim 1, wherein the identity association for prefix delegation option is encapsulated in a field of the identity association for prefix assignment option.

11. The method for configuring IP addresses of claim 1, wherein the identity association for prefix assignment option further comprises a second time representing a time duration during which the host may contact another DHCP server to extend lifetimes of the prefix.

12. The method for configuring IP addresses of claim 1, wherein the identity association for prefix delegation option comprises a preferred lifetime for the IPv6 address.

13. The method for configuring IP addresses of claim 12, wherein the identity association for prefix delegation option comprises IAaddr options associated with the IPv6 address.

14. A method for generation of Internet Protocol (IP) addresses in a host, comprising:
   sending a request from the host to identify a DHCP server;
   using an identity association for prefix assignment option, providing a prefix to the host by transmitting the identity association for prefix assignment option from the DHCP server to the host, wherein the identity association for prefix assignment option comprises:
      a unique identifier for the host and an identity association for prefix delegation option
      a first time representing a time duration during which the host may contact the DHCP server to extend lifetimes of the prefix, and
      a valid lifetime for an IPv6 address;
   generating an interface identifier in the host by computing a cryptographic hash of a public key of the host;
   combining the prefix and interface identifier to configure an IP address in the host;
   registering the IP address in the DHCP server; and
   granting the IP address from the DHCP server to the host.

15. The method for generation of IP addresses of claim 14, wherein the prefix is predefined and stored in the DHCP server.

16. The method for generation of IP addresses of claim 14, wherein the prefix is authorized by a router.

17. The method for generation of IP addresses of claim 14, wherein the prefix is provided to an interface of the host.

18. The method for generation of IP addresses of claim 14, wherein a first prefix is provided to a first interface of a first host, and a second prefix is provided to a second interface of a second host.

19. The method for generation of IP addresses of claim 18, wherein the first prefix is authorized by a first router, a first set of subnet prefixes is provided to the first router; and wherein the second prefix is authorized by a second router, a second set of subnet prefixes is provided to the second router.

20. The method for generation of IP addresses of claim 14, wherein a status-code is used to determine whether to grant or deny the usage of the combined IP address.

21. The method for generation of IP addresses of claim 14, wherein the identity association for prefix delegation option is encapsulated in a field of the identity association for prefix assignment option.

22. The method for generation of IP addresses of claim 14, wherein registering the IP address in the DHCP server comprises sending a identity association address validation option.

23. The method for generation of IP addresses of claim 22, wherein the identity association address validation option is encapsulated in an optional field of an identity association for temporary addresses option.

24. The method for generation of IP addresses of claim 14, wherein the identity association for prefix assignment option further comprises:
  a second time representing a time duration during which the host may contact another DHCP server to extend lifetimes of the prefix;
  a preferred lifetime for the IPv6 address; and
  IAaddr options associated with the IPv6 address.

25. A system for generating Internet Protocol (IP) addresses, comprising:
  a Dynamic Host Configuration Protocol (DHCP) server, wherein the server has a memory for storing a list of prefixes of internet protocol (IP) addresses, wherein the DHCP server is configured to provide a prefix using an identity association for prefix assignment option, and wherein the identity association for prefix assignment option comprises:
    a unique host identifier and an identity association for prefix delegation option,
    a first time representing a time duration during which a host may contact the DHCP server to extend lifetimes of the prefix, and
    a valid lifetime for an IPv6 address;
  at least one host, wherein the host comprises a processor for generating interface identifiers (IDs) and formulating the IP addresses by combining the generated IDs and the prefixes, wherein the host is configured to generate the interface identifiers by computing a cryptographic hash of a public key of the at least one host; and
  a communication channel between the DHCP and the host for sending request and/or transferring data.

26. The system for generating IP addresses of claim 25, wherein the communication channel comprises a router.

27. The system for generating IP addresses of claim 25, wherein the IP address comprises a dynamic IP address.

28. The system for generating IP addresses of claim 25, wherein the prefix is predefined and stored in the DHCP server.

29. The system for generating IP addresses of claim 25, wherein a plurality of hosts is interconnected within a local area network.

30. The system for generating IP addresses of claim 25, wherein the identity association for prefix assignment option further comprises:
  a second time representing a time duration during which the host may contact another DHCP server to extend lifetimes of the prefix;
  a preferred lifetime for the IPv6 address; and
  IAaddr options associated with the IPv6 address.

31. A computational device, comprising a communications system, a processor, and a memory coupled with the processor, the memory comprising a non-transitory computer-readable medium having a computer-readable program embodied therein for directing operation of the computational device, the computer readable program including:
  instructions for receiving prefixes with the communications system, wherein the prefixes are received using identity association for prefix assignment options, and wherein each identity association for prefix assignment option comprises:
    a unique host identifier and an identity association for prefix delegation option,
    a first time representing a time duration during which the computational device may contact a Dynamic Host Configuration Protocol (DHCP) server to extend lifetimes of the prefix, and
    a valid lifetime for an IPv6 address;
  instructions for generating interface identifiers, wherein the instructions are configured to generate the interface identifiers by computing a cryptographic hash of a public key of the computational device; and
  instructions for combining the prefixes and the generated interface identifier.

32. The computational device of claim 31, wherein the prefixes are provided by a DHCP server.

33. A network apparatus comprising:
  a network interface, the network interface being configured to communicate to a router, wherein:
  the network interface is adapted to receive a first request for providing prefixes from the network apparatus, the network interface being configured to send a response to the router, wherein the response comprises an identity association for prefix assignment option, and wherein the identity association for prefix assignment option comprises:
    a unique host identifier and an identity association for prefix delegation option,
    a first time representing a time duration during which a host may contact the network apparatus to extend lifetimes of the prefix, and
    a valid lifetime for an IPv6 address;
  the network interface is further configured to receive a second request for registering an Internet Protocol (IP) address, the IP address being formulated by combining the prefixes and generated interface identifiers, wherein the interface identifiers are generated by computing a cryptographic hash of a public key of a computational device;
  a memory being configured to store the prefixes, the IP address and system information; and
  a processor being configured to process the first and second request.

34. The network apparatus of claim 33, wherein the interface identifiers are generated in the computational device that is in a communication with the network apparatus through the router.

* * * * *